Feb. 3, 1970        H. G. NABINGER        3,493,245

MANUALLY PROPELLED CART AND LIFT FOR INVALIDS

Filed May 24, 1968        3 Sheets-Sheet 1

*INVENTOR*
HERMAN G. NABINGER

Feb. 3, 1970   H. G. NABINGER   3,493,245
MANUALLY PROPELLED CART AND LIFT FOR INVALIDS
Filed May 24, 1968   3 Sheets-Sheet 2

INVENTOR
HERMAN G. NABINGER

Feb. 3, 1970   H. G. NABINGER   3,493,245
MANUALLY PROPELLED CART AND LIFT FOR INVALIDS
Filed May 24, 1968   3 Sheets-Sheet 3

*INVENTOR*
HERMAN G. NABINGER

United States Patent Office 3,493,245
Patented Feb. 3, 1970

3,493,245
MANUALLY PROPELLED CART AND LIFT FOR INVALIDS
Herman G. Nabinger, 311 Kirk Ave., Syracuse, N.Y. 13205
Filed May 24, 1968, Ser. No. 731,972
Int. Cl. B60r 21/00
U.S. Cl. 280—250                                6 Claims

ABSTRACT OF THE DISCLOSURE

This invention consists of a horizontally disposed U-shaped frame supported by a wheel on each end thereof, and a third wheel that is located in the lateral center of the front portion thereof. This third wheel is steered by an angularly disposed steering wheel that is mounted on top of a rectangular vertically disposed hollow structure that is located on top of the aforesaid U-shaped frame. Hand operated gear, chain, and sprocket mechanism are located within the aforesaid hollow structure from the back end of which extends a horizontally disposed and vertically movable seat on which an invalid can be seated. This invention is of great use when the invalid must move from a chair to another seat or the like of different height than that of the chair, an example might be a toilet. The aforesaid mechanism, which is operated by a hand wheel located on each side of the aforesaid hollow structure, will not only permit the invalid to raise or lower his seat but also to propel himself forward or backward since the mechanism is also connected by chains to the two wheels of the aforesaid U-shaped frame. A safety belt and chest rest, that is adjustable in height, is included as a part of this invention.

---

This invention relates to carts; more particularly, to a cart especially designed to convey a person from a chair or the like to another chair or the like of a different height; still more particularly, to a cart that is moved about by mechanism operated by the person who is riding on the seat of the cart.

It is the principal object of this invention to provide a manually propelled cart and lift for invalids that can be operated in its entirety by the invalid using the cart.

Another object of this invention is to provide a manually propelled cart and lift for invalids that has mechanism embodying chains, gears, and screws, thereby providing a means of both propulsion and lift of the seat that is positive in operation and is not as likely to break down, or otherwise become inoperative, as other types of mechanism.

Another object of this invention is to provide a manually propelled cart and lift for invalids that can be used by nearly any man or woman in so long as he is able to sit in an upright position for even a short period of time.

Still another object of this invention is to provide a manually propelled cart and lift for invalids that has its mechanism enclosed within a vertically disposed body and the entire cart and lift is of minimum size and, therefore, takes up little space in the room or rooms in which it is to be used.

Other and further objects and advantages of this novel and useful invention of a manually propelled cart and lift for invalids will no doubt come to mind as the reading of this specification and its appended claims proceeds and the accompanying drawings are examined.

In the drawings.

In the several views of this invention, like parts are indicated by like reference numbers.

Figure 1:
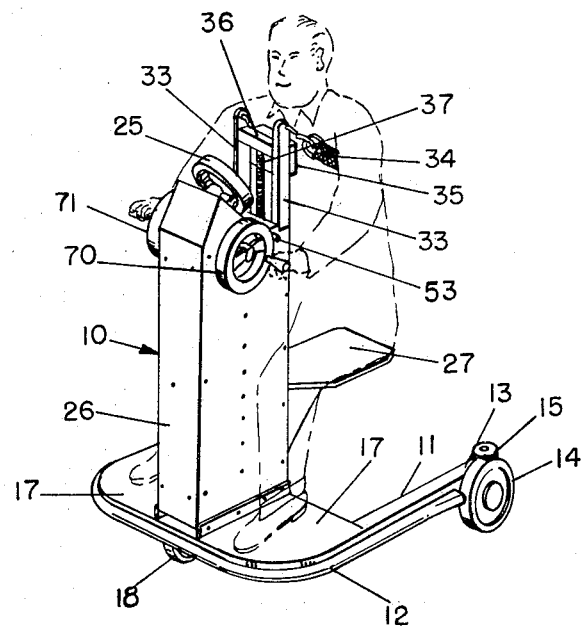
FIG. 1 is a pictorial view of this invention in actual use.

The reference number 10 indicates this invention in its entirety.

Looking now at the first three figures of the accompanying drawings, it will be seen that this invention consists of a horizontally disposed U-shaped frame 11 that is provided with a non-marring rubber bumper 12 on the outside vertical surface thereof which protects any object from being scarred should the cart and lift accidentally run into the same. Each outer end 13 of the aforesaid frame 11, which in itself is U-shaped in cross-section, is supported by a drive or propelling wheel 14 as well as two vertically disposed, spaced, and parallel free-turning bumper wheels 15. The forward end of the aforesaid U-shaped frame 11 is provided with two spaced and parallel stabilizing wheels 16 that are located approximately one-half inch above the floor on which this invention rests. The purpose of the two just-mentioned wheels, seen only in FIGURE 5 of the accompanying drawings, is to prevent the cart and lift from tipping over should a heavy person stand on its carpeted floor 17. The steering wheel 18 is located directly in the lateral center of the forward portion of the cart and lift, as will be seen on examination of FIGURE 5 of the drawings. The steering wheel 18 is supported by an axle and a vertically disposed U-shaped support 19 that has a hollow bearing 20 extending through the plate 21 of the structure of this invention. A vertically disposed shaft 22 has its lower end passing through the hollow bearing 20 to terminate in securement to the top of the aforesaid U-shaped support 19, while the upper end of the shaft 22 terminates in a flexible supporting joint 23 that is provided with a steering shaft 24 to the upper end of which is suitably secured the angularly disposed steering wheel 25.

Figure 2:
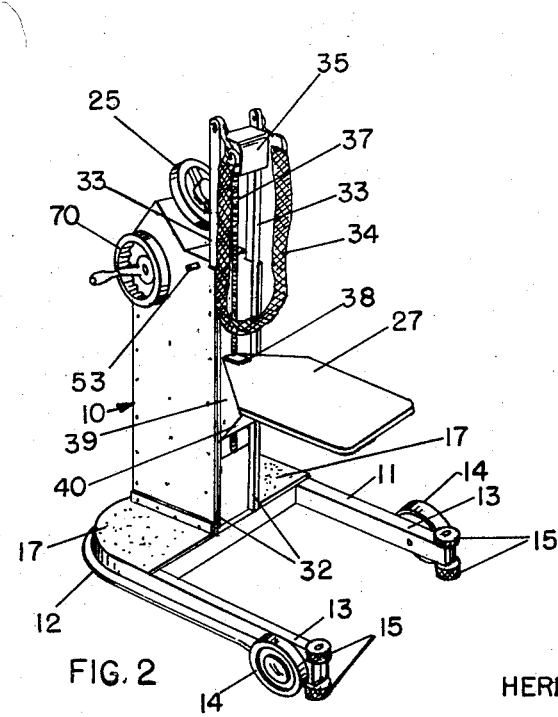
FIG. 2 is a pictorial view of this invention as viewed from the back and left of the cart and lift.
Figure 3:
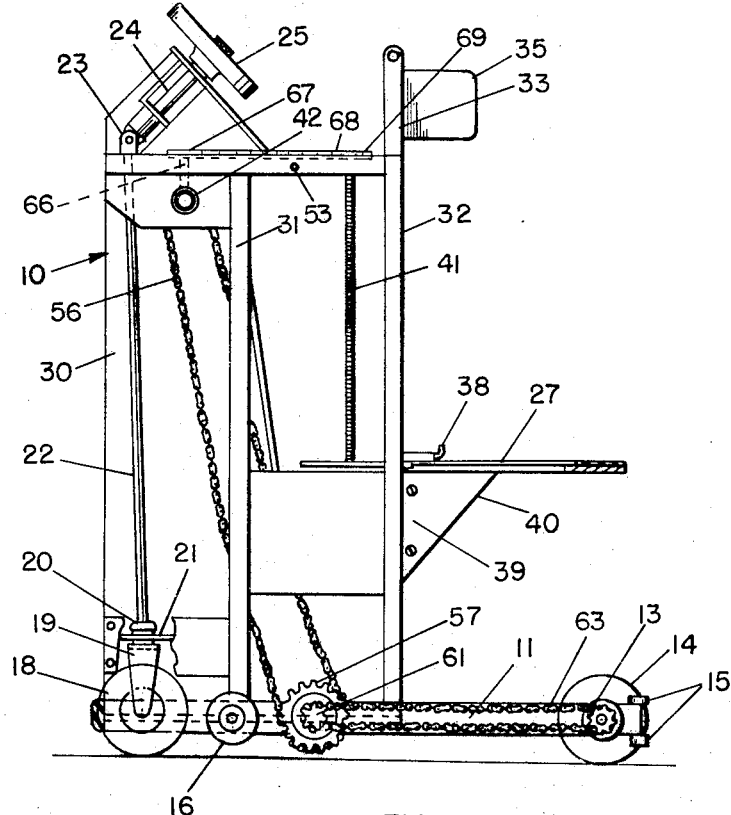
FIG. 3 is a side view of this invention with its panels removed in order to show some of the mechanism.

Continuing to look at FIGURES 1, 2, and 3, it will be seen that this invention is provided with a hollow vertically disposed box-like structure 26 that houses and supports the just-described steering wheel and its mechanism. It also contains the major portion of the propelling mechanism as well as provides a support for the vertically movable seat 27 on which an invalid rides when using this cart and lift. The aforesaid box-like structure 26 has its bottom suitably secured to cross-members 28 and 29 as well as to the upper surface of the front portion of the aforesaid horizontally disposed U-shaped frame 11. The box-like structure is composed of vertical members 30 and 31, all of which are not visible in any of the views of the accompanying drawings, and the necessary side and end plates which are not indicated by any reference numbers in any of the views of the drawings for reasons of clarity. Two laterally spaced, parallel, and vertically disposed members 32 are parallel to, and rearward to the just mentioned members 31. Members 32 are fabricated in a hollow U-shaped form (when viewed from the end) in order to provide space for the vertically slidable safety belt support bars 33. A safety snap hook is secured to the upper end of each of the aforesaid bars 33. One end of a safety belt 34 is secured to one end of one of the snap hooks, while the other end of the same belt is likewise secured to one end of the other snap hook. The upper portion of each of the two aforesaid bars 33 provides end support for the chest pad 35 as well as for the cross-bar 36, to the lateral center of which is suitably secured the upper end of the vertically disposed screw 37 that provides a means of securement for the structure that holds the aforesaid safety belt 34 and the chest pad 35. A lock catch 38 is adapted to hold the aforesaid seat 27 in its desired vertical position.

The horizontally disposed and carpeted seat 27 has its front end secured to the top of a triangularly shaped structure 39 which can either be made from a composition material or else provided with a composition covering on its angularly disposed surface 40 in order to prevent accidental damage to a porcelain toilet bowl when backing this invention up to a toilet for an invalid to transfer either to or from the seat of this cart and lift to a toilet seat. The aforesaid triangularly shaped structure 39 has its forward end slidably mounted in the rear portion of the vertically disposed structure of this invention between the two already mentioned members 32. The vertically mounted screw 41 passes through an elongated recess in the horizontally disposed plate of the aforesaid seat 27, thereby providing a means of causing the seat 27 to be raised or lowered when the shaft 41 is rotated, as will hereinafter be described.

Having described the structure of this invention, as well as its steering mechanism and safety belt and chest pad along with the seat, the propelling and seat lifting mechanism will now be described in detail.

Figure 6:
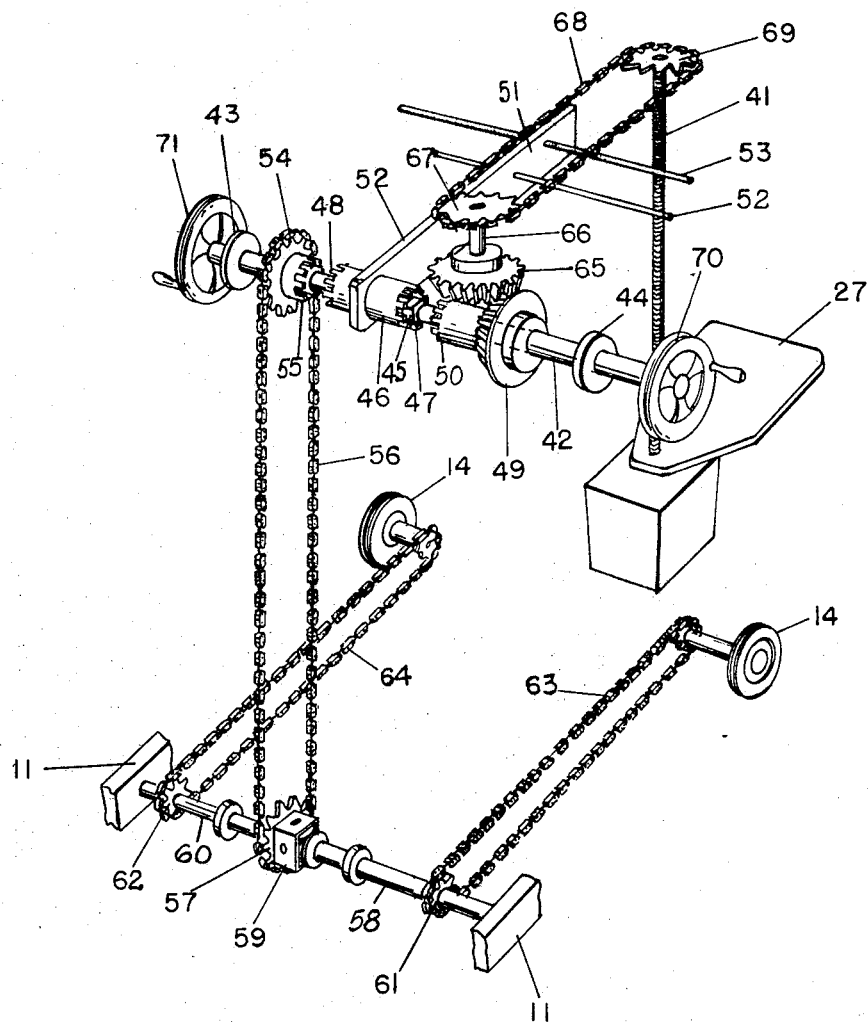
FIG. 6 is a pictorial view of the propulsion and lift mechanism of this invention.

Attention is directed to FIGURE 6 of the accompanying drawings. Here it is seen that a laterally disposed shaft 42 is suitably supported by end bearings 43 and 44. The shaft 42 is round in cross-section, except for its center portion 45 which is square in cross-section and on which laterally slides shifter 46 whose two ends are provided with a plurality of radially disposed teeth 47 and 48. A free turning bevel gear 49, having a hub that is the same diameter as that of the aforesaid shifter 46, has a plurality of teeth 50 thereon that will engage the teeth 47 of the shifter 46 when the shifter is moved laterally by means of its manually operated slider arm 51. The manually operated slider arm 51 is slidably mounted on the laterally disposed rod 52 and is pushed from one side to the other by ones hand on the end of the shift lever 53. A free-turning sprocket 54 is also mounted on the aforesaid shaft 42, sprocket 54 being provided with a hub that is the same diameter as that of the aforesaid shifter 46. The teeth 55, formed in the end of the hub of sprocket 54, will engage the teeth 48 of the shifter 46 when the shifter is moved to that side of this invention in the manner already described. An endless chain 56 encompasses in part both the aforesaid sprocket 54 and sprocket 57 that is secured on the shaft 58 of the differential 59, while a second shaft 60 extends out the other side of the differential 59, as is clearly shown in FIGURE 5 of the accompanying drawings. The outer end of shaft 58 is provided with a sprocket 61 while the outer end of shaft 60 is provided with a sprocket 62. Endless chains 63 and 64 encompass in part the aforesaid sprockets as well as similar sprockets mounted on the inside end of the shafts to which the aforesaid propelling wheels 14 are secured.

Figures 4, 5:
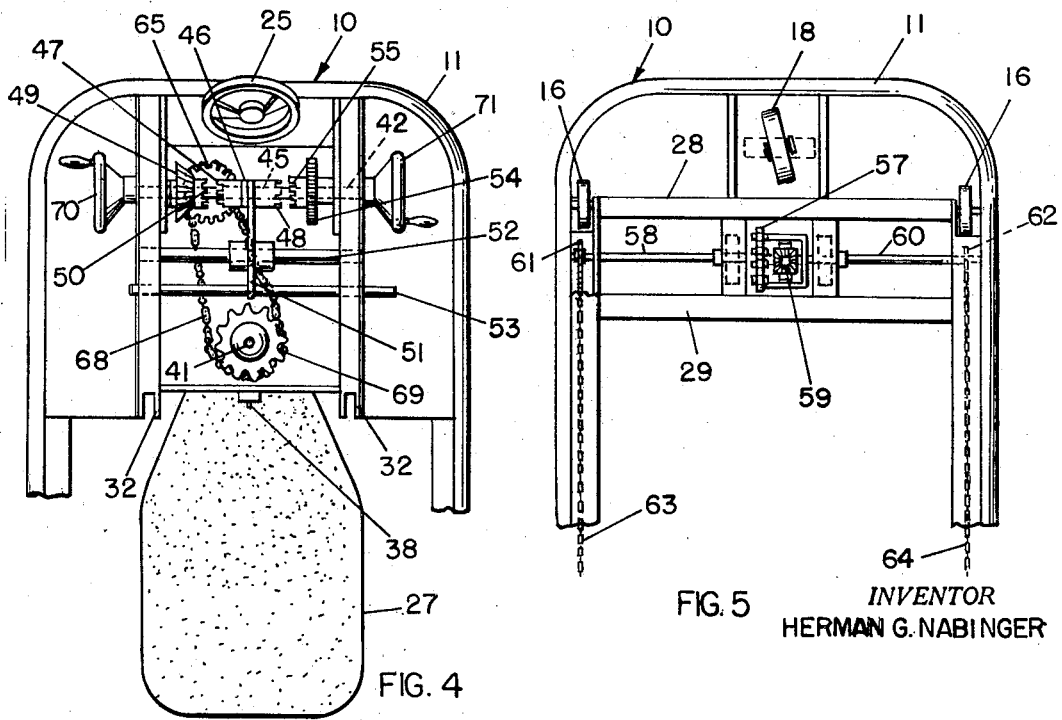
FIG. 4 is a top view of this invention with its top center panel removed for reasons of clarity as has been its supporting wheels and certain other details of construction.
FIG. 5 is a bottom view of this invention with many of its details of construction removed for reasons of clarity.

Looking now at both FIGURES 4 and 6, it will be seen that a horizontally disposed bevel gear 65 has its teeth engaged with that of the teeth of the aforesaid bevel gear 49. Gear 65 is located on the lower end of the vertically disposed shaft 66 that has a sprocket 67 secured to its upper end. An endless chain 68 encompasses in part both the aforesaid sprocket 67 and the sprocket 69 that is secured to the upper end of the aforesaid screw shaft 41 that by its rotation will raise or lower the aforesaid seat 27. A chain lock that is not visible in any of the views of the accompanying drawings, is mounted on this invention as to engage the chain 68 when the aforesaid slider arm 51 is moved to the position for the invalid riding in this cart and lift to propel himself or herself forward by grasping the outwardly extending handles of the two hand wheels 70 and 71 that are secured to the outer ends of the aforesaid shaft 42. The action of the aforesaid chain lock will prevent the seat 27 from accidentally dropping while the cart and lift is being propelled and thereby perhaps causing serious injury to the invalid riding thereon. The moment the slider arm 51 is moved in the opposite direction for raising or lowering the seat 27, the shift lock will become disengaged from the chain 68, thus permitting the chain to rotate in its prescribed manner.

The way in which this new and useful manually propelled cart and lift for invalids is used is quite simple. The cart is placed next to an invalid's chair in which the said invalid is sitting. The invalid slides himself onto the aforesaid seat 27 of the cart and lift 10 to the position shown in FIGURE 1 of the accompanying drawings. Here it is seen that as a safety measure, the safety belt 34 is placed around the upper part of the invalid's body. Each end of the safety belt is secured to the upper ends of the two vertically disposed bars 33. The invalid now takes his left hand and pushes the outer end of the aforesaid shift lever 53 inward thus moving the slider arm 51 to the right hand side of the cart and lift. The outer end of the aforesaid slider arm 51 being provided with a horizontally disposed elongated recess therein in which is located the shifter 46 that has a circular groove therein adapted to receive the aforesaid slider arm 51 which now moves the shifter 46 to the right where its radially disposed teeth 48 will engage the teeth 55 of the hub of the free-turning sprocket 54 over which the chain 56 passes. The chain 56 also passes over the sprocket 57 which is on shaft 58 that has its inner end secured to one of the gears of the aforesaid differential 59. A chain drive on the outer end of the aforesaid shaft 58 and shaft 60 of the aforesaid differential 59 will thus rotate the two drive or propelling wheels 14 when the two hand wheels 70 and 71 are manually rotated by the invalid that is seated on the cart and lift since the drive chains on shafts 50 and 60 pass over the sprockets of the shafts of the just-mentioned propelling wheels. The invalid will steer the cart and lift to whatever place he desires to go as he rotates the aforesaid hand wheels 70 and 71. The steering being done by means of the angularly disposed steering wheel 25. Upon arriving at his destination, the invalid will, if he finds the chair higher or lower than that of the seat 27 of the cart and lift 10, take his right hand and push the end of the aforesaid shift lever 25 inward, thereby causing the chain lock to unlock the chain 68. The chain 68 can now be rotated when the slider arm 51 has pushed the shifter 46 to the left of the cart and lift, thereby disengaging teeth 48 from 55 and engaging teeth 47 of the shifter 46 with teeth 50 of the hub of the free-turning bevel gear 49. Bevel gear 49 has its teeth in mesh with the teeth of the bevel gear 65, located on the lower end of the vertically disposed shaft 66 that has a sprocket 67 secured to the upper end thereof. A horizontally disposed endless chain 68 encompasses part of the aforesaid sprocket 67 and also sprocket 69 which is located on the upper end of the aforesaid vertically mounted screw 41. When the aforesaid bevel gear 65 is rotated, the aforesaid screw shaft 41 will therefore be rotated. The just-mentioned screw shaft 41 passes through the front end of the aforesaid seat 27 in such a manner as to cause the seat to be raised or lowered when the shaft is rotated. This just-described action occurs when the aforesaid hand wheels 70 and 71 are rotated by the invalid sitting on the seat of this cart and lift, as will be understood by those experienced in the mechanical arts upon examination of the accompanying drawings. When the seat 27 has been raised or lowered to the desired height, the invalid will unhook the aforesaid safety belt 34 from the bars 33 and then slide onto the desired chair.

Although not shown in any of the views of the accompanying drawings, certain alternate forms of construction are suggested. For example, the two hand wheels 70 and 71 can be replaced by geared electric motors having controls that will be operated by hand, by foot, or by the side of ones legs. Suitable electric batteries to activate the motor can be carried in the lower part of the aforesaid vertically disposed box-like structure 26. This invention can be provided with suitable hand and/or foot brakes, if one so desires. Foot steering mechanism can also be adapted to this cart and lift for people having limited or no use of their hands.

From the foregoing, it is seen that I have now provided a new and useful manually-propelled cart and lift for invalids that meets all of the objects of this invention and others that may come to mind.

What I now claim as new and desire to secure by Letters Patent is:

1. A manually propelled cart and lift for invalids, comprising a horizontally disposed U-shaped frame supported by a plurality of wheels; a vertically disposed box-like structure secured to the lateral center of the said frame, the said box-like structure having a horizontally disposed vertically adjustable seat extending outward from the back end thereof; means of propelling and steering the said cart and lift by the invalid riding on the seat thereof; as well as means for the invalid on the said seat to raise or lower the said seat after he has seated himself thereon.

2. The invention of claim 1, wherein all of the propelling and seat raising and lowering mechanism is of the chain drive type.

3. The invention of claim 2, wherein the steering of the said cart and lift is accomplished by means of an angularly disposed steering wheel located on top of the said box-like structure, the said hand wheel being connected to a wheel located under the front and lateral center of the said frame by means of a vertically disposed shaft and an angularly disposed shaft.

4. The invention of claim 3, wherein the said cart and lift is provided with a small stabilizing wheel under each side of the said U-shaped frame which is also provided with a rubber bumper that is secured to its periphery.

5. The invention of claim 4, wherein the same two hand wheels, by which the invalid propels the said cart and lift, are also used to raise and lower the said seat after a laterally disposed shift lever in the form of a push rod is moved by the invalid on the said seat, the said shift lever being adapted to effect the necessary change in the said mechanism by means of a slider arm whose front end is adapted to laterally move a shifter having radially disposed teeth on each end thereof; the said shifter sliding on the square portion of a rod that is supported laterally by a bearing near each end thereof that is located in the upper front portion of the said box-like structure; the said rod having a free-turning bevel gear on one side thereof; and a free-turning sprocket on the other side thereof, both the said bevel gear and the said sprocket having hubs provided with radially disposed teeth adapted to mesh with the teeth of the said shifter when moved in the proper position by the said slider arm; the said bevel gear being in mesh with a second bevel gear that is secured to the lower end of a vertically disposed shaft having a sprocket secured to the upper end thereof; and an endless chain encompassing in part the last-mentioned sprocket as well as a sprocket that is secured to the upper end of a vertically mounted screw that passes down through the front portion of the said seat, thereby providing a means of raising and lowering the said seat; and the said free-turning sprocket being encompassed in part by an endless chain that encompasses a sprocket adapted to chain driving mechanism that will give forward or backward motion to the said cart and lift depending on which way the said hand wheels are rotated.

6. The invention of claim 5, wherein the said cart and lift is provided with a vertically adjustable seat belt and chest pad.

References Cited

UNITED STATES PATENTS

| | | | |
|---|---|---|---|
| 2,539,346 | 1/1951 | Feist | 5—86 |
| 2,576,413 | 11/1951 | Padjen | 280—250 |
| 2,614,267 | 10/1952 | Perri | 5—86 |
| 2,869,614 | 1/1959 | Wamsley. | |
| 2,962,730 | 12/1960 | Carnes et al. | 5—86 |
| 3,137,011 | 6/1964 | Fisher | 5—86 |
| 3,137,869 | 6/1964 | Johnson | 5—86 |

KENNETH H. BETTS, Primary Examiner

U.S. Cl. X.R.

5—86; 280—150